United States Patent [19]

Schwab

[11] 4,260,694

[45] Apr. 7, 1981

[54] P-METHYLSTYRENE DIENE BLOCK COPOLYMERS

[75] Inventor: Frederick C. Schwab, Metuchen, N.J.

[73] Assignee: Mobil Oil Corporation, New York, N.Y.

[21] Appl. No.: 98,585

[22] Filed: Nov. 29, 1979

[51] Int. Cl.$^3$ ............................................. C08F 297/00
[52] U.S. Cl. ..................................... 525/314; 525/333
[58] Field of Search .......................................... 525/314

[56] References Cited

U.S. PATENT DOCUMENTS

| | | | |
|---|---|---|---|
| 3,333,024 | 7/1967 | Haefele et al. | 525/314 |
| 3,439,064 | 4/1969 | Makowski et al. | 525/314 |

*Primary Examiner*—Stanford M. Levin
*Attorney, Agent, or Firm*—Charles A. Huggett; Hastings S. Trigg

[57] ABSTRACT

This invention provides an A-B-A p-methylstyrene-conjugated diene-p-methylstyrene block copolymer containing, by weight of the block copolymer, about 10–40% p-methylstyrene and about 90–60% conjugated diene.

5 Claims, No Drawings

P-METHYLSTYRENE DIENE BLOCK COPOLYMERS

BACKGROUND OF THE INVENTION

1. Field of the Invention

This invention is directed to p-methylstyrene-conjugated diene-p-methylstyrene A-B-A block copolymers.

2. Description of the Prior Art

Elastomeric A-B-A styrene-diene block copolymers have been known. The A-B-A block copolymers of this invention using high purity p-methylstyrene have lower density and higher use temperature than the block copolymers made with styrene or vinyl toluene (65% m-methylstyrene).

SUMMARY OF THE INVENTION

This invention provides an A-B-A p-methylstyrene-conjugated diene-p-methylstyrene block copolymer containing, by weight of the block copolymer, about 10–40% p-methylstyrene and about 90–60% conjugated diene.

DESCRIPTION OF SPECIFIC EMBODIMENTS

A monomer used in preparing the A blocks of the A-B-A block copolymers of this invention is p-methylstyrene. It is within the contemplation of this invention to use mixtures of methylstyrene rich in p-methylstyrene. Such mixtures contain at least 95 weight percent, preferably 97–99 weight percent, p-methylstyrene and less than 0.1 weight percent o-methylstyrene with the balance being m-methylstyrene. A typical mixture contains, by weight, about 97 percent p-methylstyrene, about 3 percent m-methylstyrene, and about 0.05 percent o-methylstyrene. The mixtures are obtained by catalytic dehydrogenation of the mixtures of ethylmethyl benzene isomers described in U.S. Pat. No. 4,086,287 to which reference is made.

The conjugated dienes to be employed in the formation of the polymer block B preferably have from 4–8 carbon atoms per molecule and still more preferably from 4–5. Thus, the preferred species are butadiene and isoprene, although methylisoprene and other conjugated dienes may be utilized, as well as mixtures thereof. Hence, the preferred block copolymers are poly(p-methylstyrene)-polybutadiene-poly(p-methylstyrene) and poly(p-methylstyrene)-polyisoprene-poly(p-methylstyrene), as well as hydrogenated derivatives of these polymers.

The hydrogenated materials may be hydrogenated to any desired extent, although the substantially complete hydrogenation of at least the conjugated diene polymer block is desirable. In any event, if hydrogenation is resorted too, it is desired to reduce the original unsaturation of the block copolymer by at least about 50% and preferably by at least about 90%. The reasons for hydrogenation are broadly two-fold in that hydrogenation increases the stability of the product as well as raises the softening point thereof. The ABA block copolymer will contain between about 10 weight percent and about 40 weight percent poly(p-methylstyrene), the balance being conjugated diene. The preparation of a typical ABA block copolymer is illustrated by a p-methylstyrene-isoprene-p-methylstyrene block copolymer. The first polymer block comprising poly(p-methylstyrene) terminated with lithium is formed in a zone by introduction of p-methylstyrene, cyclohexane (as solvent), and secondary butyl lithium into the polymerization zone.

After formation of the first polymer block, the second stage in the process wherein the elastomeric polymer block is formed is effected by introduction of isoprene into the reaction mixture, preferably together with further solvent, including a refluxing phase for temperature control. This results in the formation of an intermediate block copolymer comprising a first block of poly(p-methylstyrene) and a second block of polyisoprene terminated with lithium. In the third stage of the process, more p-methylstyrene is added to the reaction mixture and polymerization continued to form the three polymer block A-B-A, still terminated with lithium which is removed in the final stage of the process by the addition of a chain terminator such as an alcohol or the like.

The initiators to be used in the process of preparing the block copolymers comprise alkyl lithium compounds which may be either primary, secondary or tertiary alkyls. These will have the general configuration

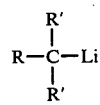

wherein R is an alkyl radical and R' is hydrogen or alkyl. They include particularly normal butyl lithium, secondary butyl lithium, tertiary butyl lithium, secondary amyl lithium, tertiary amyl lithium, secondary hexyl lithium, tertiary hexyl lithium and other alkyl lithium compounds preferably having from 4 to 8 carbon atoms per molecule.

The proportion of initiator taking an active part in the block copolymerization will be varied between about 100 and about 2000 parts per million, based on the weight of the total monomers used.

Polymerization will be conducted at temperatures in the order of −20° C. to about 100° C., preferably at temperatures between about 20° C. and 65° C., the temperature being controlled to yield the polymer product within a reasonable length of time at the initiator level being utilized.

The conditions of polymerization are adjusted so as to produce a first polymeric block having an average molecular weight between about 2,000 and 100,000. Having formed this first polymer block, the next stage in the process comprises addition of the second type of monomer, in this illustrative instance being a conjugated diene, such as one of those enumerated above. The proportion of monomer, assuming substantially complete polymerization thereof, will be sufficient to form a polymer block having an average molecular weight between about 25,000 and 1 million. Since, under the conditions of the process, the first polymer block is a "living polymer chain" terminated with a lithium radical, the block polymerization proceeds at the end of each of these living chains to form an intermediate two-block polymer having the structure A-B-Li. After completion of the second polymer block, the terminal polymer block will be formed by introduction of the p-methylstyrene. Again, this block copolymerizes with the living polymer chains and results under the condition employed in the formation of a living three-block polymer having the general configuration A-B-A-Li. The lithium is deactivated and the polymerization terminated by the injection at this point of a suitable chain terminator such as an alcohol, $H_2O$ or other known agents for this purpose.

Block copolymerization is preferably conducted in the presence of solvents. These must be chosen with some care for two principal aspects: If a borderline solvent system is utilized, in which the block copolymer at any stage in its preparation becomes somewhat insoluble, the danger exists that chain growth will be slow and non-uniform from monomer being rendered inaccessible to the growing chains at that point, resulting in broad molecular weight distributions both for the block in question and for the next block to form thereon. Precipitation of a polymer at any stage may be due either to insolubility of the particular species at that time in the solvent present but may be strongly affected by the temperature utilized for the polymerization procedure. Solvents may be selected for a secondary purpose, namely, the control of temperature during polymerization by reflux. Consequently, the temperature and solvent chosen for the process both have powerful effects on the ultimate properties of the polymerization product.

When the block copolymer being formed is one in which the two terminal blocks are poly(p-methylstyrene) blocks, it is preferable to employ a cyclic hydrocarbon, which may be either a cycloaliphatic such as cyclohexane or a member of the benzene series such as benzene or toluene. The former type namely, cycloaliphatic hydrocarbon, is preferred since such materials are more easily purified. It is realized that mere traces of certain impurities such as acetylenic impurities may have powerful deleterious effects upon the continuance of polymerization in the presence of the extremely small proportions of catalyst required.

Anionic polymerization is hindered by the presence of impurities that will react with the alkyl lithium initiators, such as acetylenic compounds, water, alcohols, and the like. In commercial scale operation, the reactants are purified by passing them through suitable absorption columns. In laboratory runs, however, purification is accomplished by titrating with butyllithium (BuLi) solution to a red end point, using phenanthroline indicator. As will be apparent, the strength of the BuLi solution is not a critical factor. The following examples demonstrate the preparation and properties of the A-B-A block copolymers of this invention.

EXAMPLE 1

Into a 500 ml. reactor was added 15 g. of paramethylstyrene (PMS) (at least 95% para) and 200 ml. cyclohexane. After purification, 0.4 ml. of 2.60 N BuLi was added and the PMS was polymerized for 2 hrs. at 50° C. Into a separate 2000 ml. reactor was added 70 g. of isoprene and 600 ml. cyclohexane. After purification of the isoprene solution, the ∓active" contents of the 500 ml. reactor was added to the 2000 ml. reactor wherein the ∓active" poly(paramethylstyryl) lithium was used to initiate the polymerization of the isoprene, which was polymerized for 3½ hrs. at 50° C. The final block of PMS (15 g.) was purified along with 300 ml. cyclohexane and 0.1 ml. tetrahydro furan. When the polymerization of the isoprene was complete, the cyclohexane/PMS/tetrahydrofuran mixture was added under $N_2$ to the 200 ml. reactor where the active poly(isoprenyl) lithium was used to initiate the polymerization of the final block of PMS. The PMS was polymerized for 3 hrs. 50° C. The polymer was collected by precipitating in methanol and drying in a vacuum oven. The recovery was 98%.

EXAMPLE 2

A similar PMS-butadiene-PMS block copolymer was made by substituting butadiene for isoprene in Example 1. Recovery was 98.9%.

EXAMPLES 3 and 4

Similarly, for comparison purposes, styrene-isoprene-styrene and styrene-butadiene-styrene block copolymers were prepared.

The block copolymers of Examples 1 through 4 were tested. Pertinent test results are set forth in the following Table.

TABLE

| Property Vinyl Aromatic Diene | Styrene Isoprene | PMS Isoprene | Styrene Butadiene | PMS Butadiene |
|---|---|---|---|---|
| % (wt.) Vinyl Aromatic (Theo.) | 30 | 30 | 30 | 30 |
| % (wt.) Vinyl Aromatic (Meas.) | 28 | 26 | 27 | 31 |
| Diene Microstructure % 1,2 or 3,4 | 14.5(3,4) | 14.5(3,4) | 7.1(1,2) | 9.4(1,2) |
| Mol. Weight (Kinetic) | 100,000 | 100,000 | 100,000 | 100,000 |
| Mn | 81,000 | 58,0000 | 94,000 | 129,000 |
| Mw GPC | 131,000 | 165,000 | 123,000 | 162,000 |
| Mw/Mn | 1.6 | 2.3 | 1.3 | 1.3 |
| Glass Transition-Tg (Vinyl Aromatic), °C. | 86 | 86 | 81 | 81 |
| Glass Transition-Tg (Diene), °C. | −53 | −57 | −91 | −91 |
| Break Strength, psi | 680 | 410 | 1150 | 2020 |
| 300% Modulus, psi | 223 | 99 | 158 | 226 |
| % Elongation | 992 | 805 | 1146 | 984 |
| Yield, g. | 98 | 98 | 98 | 98 |
| Density, gm/cc | .946 | .938 | .942 | .934 |

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. An A-B-A p-methylstyrene-conjugated diene-p-methylstyrene block copolymer containing, by weight of the block copolymer, about 10-40% p-methylstyrene and about 90–60% conjugated diene.

2. The block copolymer of claim 1, wherein said conjugated diene is isoprene.

3. The block copolymer of claim 1, wherein said conjugated diene is butadiene.

4. The block copolymer of claim 2 containing about 30% p-methylstyrene and about 70% isoprene.

5. The block copolymer of claim 3 containing about 30% p-methylstyrene and about 70% butadiene.

* * * * *